(12) United States Patent
Jeon et al.

(10) Patent No.: US 8,134,948 B2
(45) Date of Patent: Mar. 13, 2012

(54) RESOURCE ALLOCATION METHOD AND APPARATUS IN DISTRIBUTED MAC FOR WIRELESS PERSONAL AREA NETWORKS

(75) Inventors: Young Ae Jeon, Daejeon (KR); Sangjae Lee, Daejeon (KR); Sangsung Choi, Daejeon (KR); Kwang Roh Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 816 days.

(21) Appl. No.: 12/182,742

(22) Filed: Jul. 30, 2008

(65) Prior Publication Data

US 2009/0154410 A1    Jun. 18, 2009

(30) Foreign Application Priority Data

Dec. 17, 2007    (KR) ................ 10-2007-0132547

(51) Int. Cl.
*H04B 7/212* (2006.01)
(52) U.S. Cl. ................. 370/322; 370/443
(58) Field of Classification Search ............. 370/252, 370/322
See application file for complete search history.

(56) References Cited

U.S. PATENT DOCUMENTS

| | | |
|---|---|---|
| 2002/0042275 A1 | 4/2002 | Kitazawa et al. |
| 2002/0099854 A1 | 7/2002 | Jorgensen |
| 2003/0152100 A1 | 8/2003 | Gaedke et al. |
| 2006/0133403 A1 | 6/2006 | Chun et al. |
| 2006/0256818 A1* | 11/2006 | Shvodian et al. ............ 370/474 |
| 2008/0137577 A1* | 6/2008 | Habetha ...................... 370/311 |
| 2008/0205353 A1* | 8/2008 | Chen et al. ................... 370/337 |

FOREIGN PATENT DOCUMENTS

| | | |
|---|---|---|
| KR | 10-2002-0027214 | 4/2002 |
| KR | 10-2006-0069141 | 6/2006 |
| WO | WO 01/89153 | 11/2001 |
| WO | 2008/095323 | 9/2006 |

OTHER PUBLICATIONS

Korean Office Action issued May 28, 2010 in corresponding Korean Patent Application 10-2007-0132547.

* cited by examiner

*Primary Examiner* — Huy Vu
*Assistant Examiner* — Adnan Baig
(74) *Attorney, Agent, or Firm* — Staas & Halsey LLP

(57) ABSTRACT

A method for allocating distributed Medium Access Control (MAC) resources in a Wireless Personal Area Network (WPAN) includes calculating an acknowledgement overhead; calculating a Medium Access Slot (MAS) overhead depending on a payload length of a frame; calculating a transfer rate; calculating a number of frame bits to be transmitted; and calculating a first number of MASs. Thereby, the method optimized a final number of MASs required per superframe. Further, a distributed MAC resource allocation apparatus includes a MAC client for determining a resource allocation scheme and an amount of resources, and for sending a request to a MAC resource management unit; a MAC physical layer for providing a received power level or the like to the MAC resource management unit; and the MAC resource management unit for determining a payload length or the like and for allocating wireless resources to devices connected to the WPAN.

7 Claims, 9 Drawing Sheets

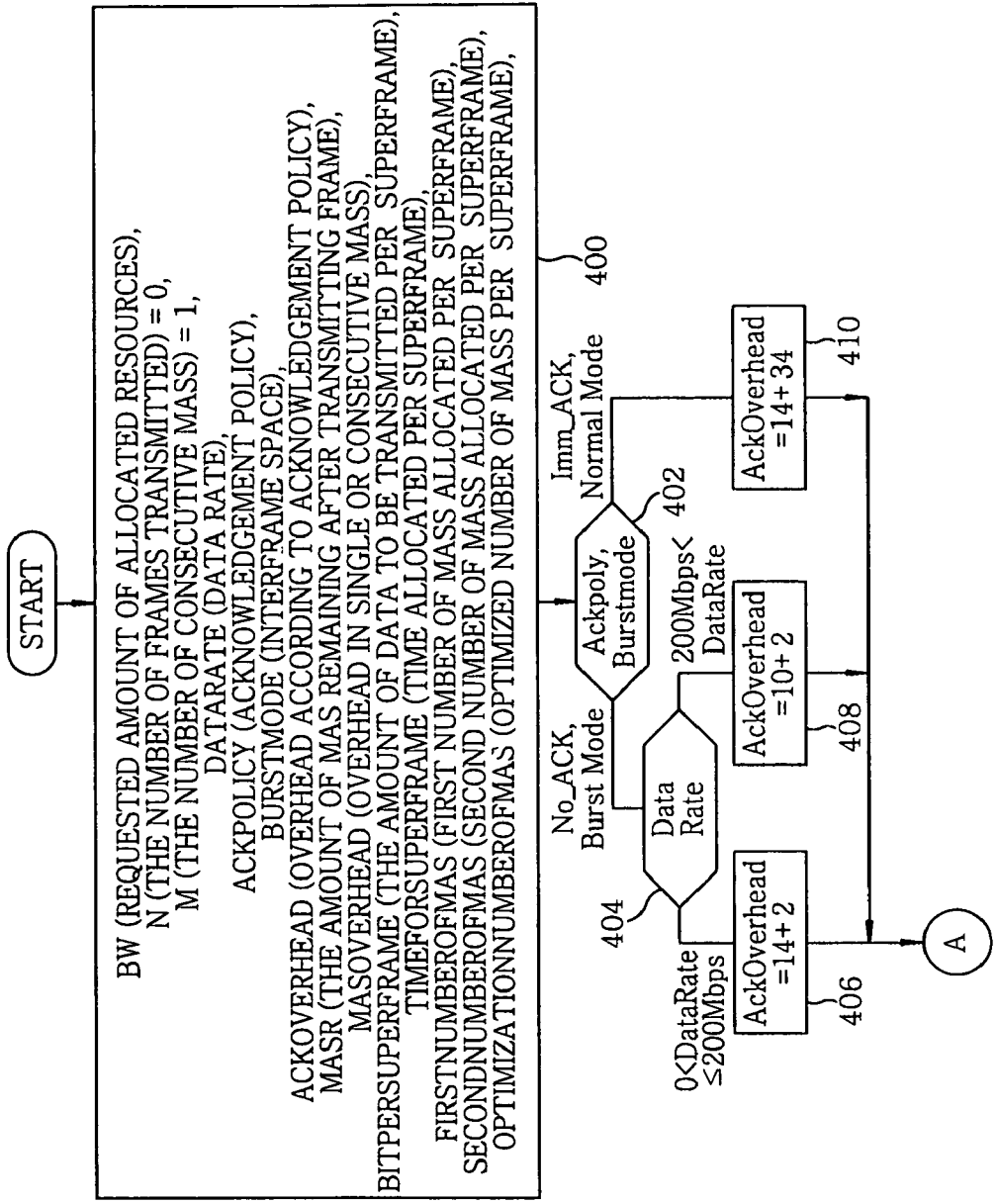

BEACON ZONE

MASS ALLOCATED BEFORE OPTIMIZATION

US 8,134,948 B2

RESOURCE ALLOCATION METHOD AND APPARATUS IN DISTRIBUTED MAC FOR WIRELESS PERSONAL AREA NETWORKS

CROSS-REFERENCE(S) TO RELATED APPLICATIONS

The present invention claims priority of Korean Patent Application No. 10-2007-0132547, filed on Dec. 17, 2007, which is incorporated herein by reference.

FIELD OF THE PRESENT INVENTION

The present invention relates to Wireless Personal Area Network (WPAN) technologies; and, more particularly, to a distributed Medium Access Control (MAC) resource allocation method and apparatus in the WPAN which determines a first number of Medium Access Slots (MASs) required per superframe and then optimizes a final number of MASs required per superframe.

This work was supported by the IT R&D program of MIC/IITA. [2006-S-071-02, Development of UWB Solution for High Speed Multimedia Transmission]

BACKGROUND OF THE PRESENT INVENTION

The Wireless Personal Area Network (WPAN) not only supports wireless connection of an audio/video device, a computer, a peripheral device, and the like, which are located within a short distance of 10 m, but also supports communication between small, low-power multimedia devices which are easy to carry, thereby supporting a variety of services.

In accordance with a distributed Medium Access Control (MAC) method for the WPAN suggested by the WiMedia-Alliance, basically, MAC not only makes each of the variety of devices transmit its own beacon frame and analyzes beacon frame information of neighboring devices thereby adjusting basic timing with neighbors, but also individually controls Quality of Service (QoS), hibernation mode, security, and the like in a distributed fashion.

The distributed MAC method for the WPAN has an advantage in that it is easy to establish a network in a wireless environment where devices are frequently connected and disconnected since each device individually manages the network, unlike a method in which a specific device manages the network in a centralized fashion. However, the distributed MAC method for the WPAN has a problem in that there is a lot of information for analysis of neighboring devices and it may take a rather long time and may waste resources to find a compromise between neighboring devices. Particularly, the wireless resources of the WPAN may be significantly wasted if not all devices have a mechanism for optimally allocating wireless resources such that indispensable wireless resources alone are allocated.

FIG. 1 illustrates a structure of a distributed MAC superframe of a general WPAN.

As shown in FIG. 1, a superframe 100 includes a Beacon Period (BP) 102 and a Data Period (DP) 104. The BP 102 includes Beacon Time Slots (BTSs), each 85☐us long, and the DP 104 includes Medium Access Slots (MASs), each 256☐us long.

FIG. 2 illustrates relations of communication of beacon frames, command frames, and data frames between neighboring devices in a general WPAN.

As shown in FIG. 2, in a network established by devices 200, 202, and 204, each device selects an unused BTS among a number of BTSs illustrated in FIG. 1 and transmits its beacon frame in the selected BTS. A device identifier (ID), its own BTS information, medium usage information, and the like of each device are transmitted by incorporating them into a beacon frame of the device. As shown in FIG. 2, each device negotiates with each other using a specific Information Element (IE) field of a beacon frame in the BP 102 shown in FIG. 1 or using a command frame in the DP 104, and thereby reserves MASs in the DP 104 to prevent competition and collision of data transmitted in the DP 104.

Despite the advantage in that it is easy to establish a network in a wireless environment where devices are frequently connected and disconnected since each device individually manages the network, the conventional distributed MAC method for the WPAN described above has a problem in that there is a lot of information to be analyzed for establishing a network with neighboring devices and it may take a rather long time and may waste wireless resources to find a compromise between neighboring devices.

SUMMARY OF THE PRESENT INVENTION

It is, therefore, a primary object of the present invention to provide a distributed MAC resource allocation method and apparatus in a WPAN which can optimize distributed allocation of MAC resources in the WPAN to prevent waste of wireless resources.

It is another object of the present invention to provide a distributed MAC resource allocation method and apparatus in a WPAN which determines the number of Medium Access Slots (MASs) required per superframe and optimizes a final number of MASs required per superframe for optimizing distributed allocation of MAC resources in the WPAN.

It is still another object of the present invention to provide a distributed MAC resource allocation method and apparatus in a WPAN, which can determine a payload length of a transmission frame, a transfer rate (or data rate), an acknowledgement policy, an interframe space, and a preamble type based on a received power level, a link quality state, a received state, and a static/dynamic physical layer parameter information provided by a physical layer and based on requirements requested by a MAC client layer; and can optimally allocate wireless resources indispensable for each device.

In accordance with one aspect of the present invention, there is provided a method for allocating distributed Medium Access Control (MAC) resources in a wireless personal area network, the method including: calculating an acknowledgement overhead determined based on an acknowledgement policy when wireless resources are allocated through networking with other distributed devices; calculating a Medium Access Slot (MAS) overhead determined based on a payload length of a frame; calculating a transfer rate required per superframe; calculating a number of frame bits to be transmitted per superframe; calculating a first number of MASs required per superframe; and optimizing a final number of MASs required per superframe.

Preferably, the calculating the acknowledgement overhead may calculate the acknowledgement overhead based on the acknowledgement policy, an interframe space, and a preamble type.

The method may include determining whether or not a payload can be transmitted in one MAS at a specific transfer rate in accordance with the payload length of the frame; determining whether or not the payload can be transmitted in two or three consecutive MASs, taking into consideration even a case where a maximum payload length is transmitted at a lowest transfer rate; and determining the MAS overhead by adding the acknowledgement overhead included in the frame and a last remaining MAS time.

It is preferable that the calculating the first number of MASs required per superframe calculates the number of the frame bits and the transfer rate required per superframe and determines the first number of MASs required per superframe in order to satisfy service requirements requested by a MAC client.

The optimizing the final number of MASs required per superframe may include allocating MASs in a manner of a row reservation scheme or a column reservation scheme taking into consideration the first number of MASs; calculating an overhead required per superframe and calculating an overhead in accordance with a number of consecutively allocated MASs; converting into MASs as much as a reduced overhead; reducing, when MASs have been allocated by the row reservation scheme, the number of allocated MASs by the unnecessary number of MASs one by one in order of increasing MAS number from zones, each having a large number of consecutive MASs, one by one in order of decreasing zone number; and reducing, when MASs have been allocated by the column reservation scheme, the number of allocated MASs by the unnecessary number of MASs one by one in order of increasing MAS number from zones, each having a large number of consecutive MASs.

In accordance with another aspect of the present invention, there is provided a distributed Medium Access Control (MAC) resource allocation apparatus in a Wireless Personal Area Network (WPAN), the apparatus including: a MAC client for determining a resource allocation scheme and an amount of resources for supporting a specific service and sending a request to a MAC resource management unit; a MAC physical layer for providing at least one of a received power level, a link quality state, a receiving state, and a static or dynamic physical layer parameter to the MAC resource management unit; and the MAC resource management unit for determining a payload length of a transfer frame, a transfer rate, an acknowledgement policy, an interframe space, and a preamble type in accordance with requirements requested by the MAC client, taking into consideration at least one of transfer rate control information, transmission power control information, interference control information, and transmission performance monitoring information, and for allocating wireless resources to devices connected to the WPAN.

Preferably, the MAC resource management unit calculates an acknowledgement overhead determined based on an acknowledgement policy; calculates a Medium Access Slot (MAS) overhead determined in accordance with a payload length of a frame to calculate a transfer rate required per superframe; calculates a number of frame bits to be transmitted per superframe; calculates a first number of MASs required per superframe; and optimizes a final number of MASs required per superframe.

Further, the MAC resource management unit may calculate the acknowledgement overhead based on the acknowledgement policy, the interframe space, and the preamble type.

It is preferable that the MAC resource management unit determines whether or not a payload can be transmitted in one MAS at a specific transfer rate in accordance with the payload length of the frame; determines whether or not the payload can be transmitted in two or three consecutive MASs, taking into consideration even a case where a maximum payload length is transmitted at a lowest transfer rate; and determines the MAS overhead by adding the acknowledgement overhead included in the frame and a last remaining MAS time.

The MAC resource management unit may calculate the number of frame bits and the transfer rate required per superframe and determine the first number of MASs required per superframe in order to satisfy service requirements requested by a MAC client.

Further, the MAC resource management unit may optimize the final number of MASs required per superframe by allocating MASs in a manner of a row reservation scheme or a column reservation scheme taking into consideration the first number of MASs; calculating an overhead required per superframe and calculating an overhead in accordance with a number of consecutively allocated MASS; converting into MASs as much as a reduced overhead; reducing, when MASs have been allocated by the row reservation scheme, the number of allocated MASs by the unnecessary number of MASs one by one in order of increasing MAS number from zones, each having a large number of consecutive MASs, one by one in order of decreasing zone number; and reducing, when MASs have been allocated by the column reservation scheme, the number of allocated MASs by the unnecessary number of MASs one by one in order of increasing MAS number from zones, each having a large number of consecutive MASs.

The distributed MAC resource allocation method and apparatus in a WPAN according to the present invention has a variety of advantages.

For example, it is possible to determine a payload length of a transmission frame, a transfer rate, an acknowledgement policy, an interframe space, and a preamble type based on a received power level, a link quality state, a received state, and a static/dynamic physical layer parameter provided by a MAC physical layer and based on requirements requested by a MAC client layer; and to optimally allocate wireless resources indispensable for each device, thereby preventing waste of the wireless resources of the WPAN and increasing the efficiency of resources.

BRIEF DESCRIPTION OF THE DRAWINGS

The above and other objects and features of the present invention will become apparent from the following description of embodiments, given in conjunction with the accompanying drawings, in which:

FIGS. 4A and 4B are flow charts illustrating a procedure for determining a first number of Medium Access Slots (MASs) required per superframe in accordance with an embodiment of the present invention;

DETAILED DESCRIPTION OF THE EMBODIMENTS

The embodiments of the present invention will now be described with reference to the accompanying drawings. In the following description of the present invention, a detailed description of known functions and configurations incorporated herein will be omitted when it may obscure the subject matter of the present invention. The terms used in the following description were defined taking into consideration the functions obtained in accordance with the present invention. The definitions of these terms should be determined based on the whole content of this specification because they may be changed in accordance with the option of a user or operator or a usual practice.

The present invention provides a distributed MAC resource allocation method and apparatus in a Wireless Personal Area Network (WPAN) which can optimize distributed allocation of MAC resources in the WPAN to prevent waste of wireless resources. Specifically, the method and apparatus can determine the number of Medium Access Slots (MASs) required per superframe and optimize a final number of MASs required per superframe for optimizing distributed allocation of MAC resources in the WPAN.

The method and apparatus can determine a payload length of a transmission frame, a transfer rate (or data rate), an acknowledgement policy, an interframe space, and a preamble type based on a received power level, a link quality state, a received state, and a static/dynamic physical layer parameter provided by a MAC physical layer and based on requirements requested by a MAC client layer and can optimally allocate wireless resources indispensable for each device.

Figure 1:
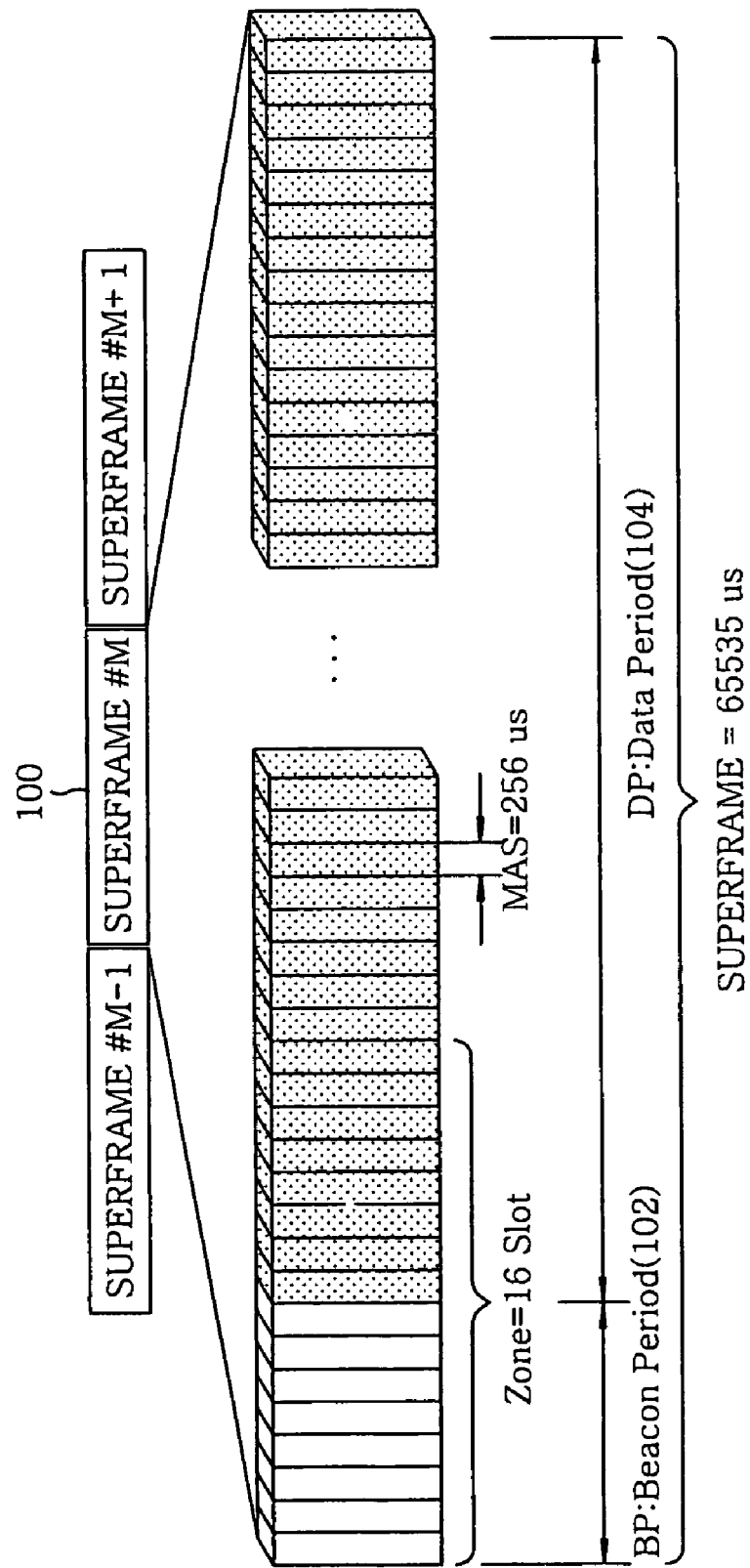
FIG. 1 illustrates a structure of a distributed MAC superframe of a general WPAN.
Figure 2:
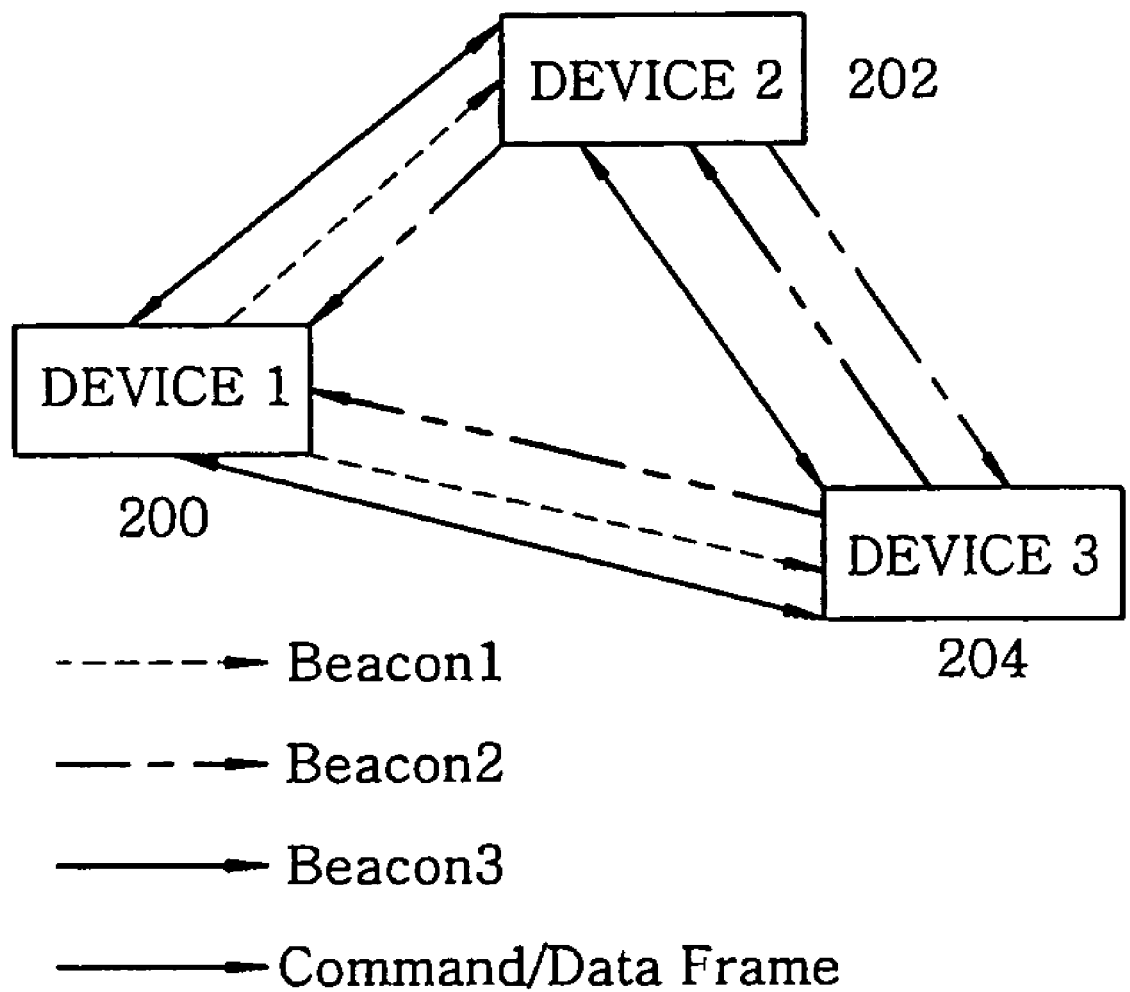
FIG. 2 illustrates relations of communication of beacon frames, command frames, and data frames between neighboring devices in a general WPAN.
Figure 3:
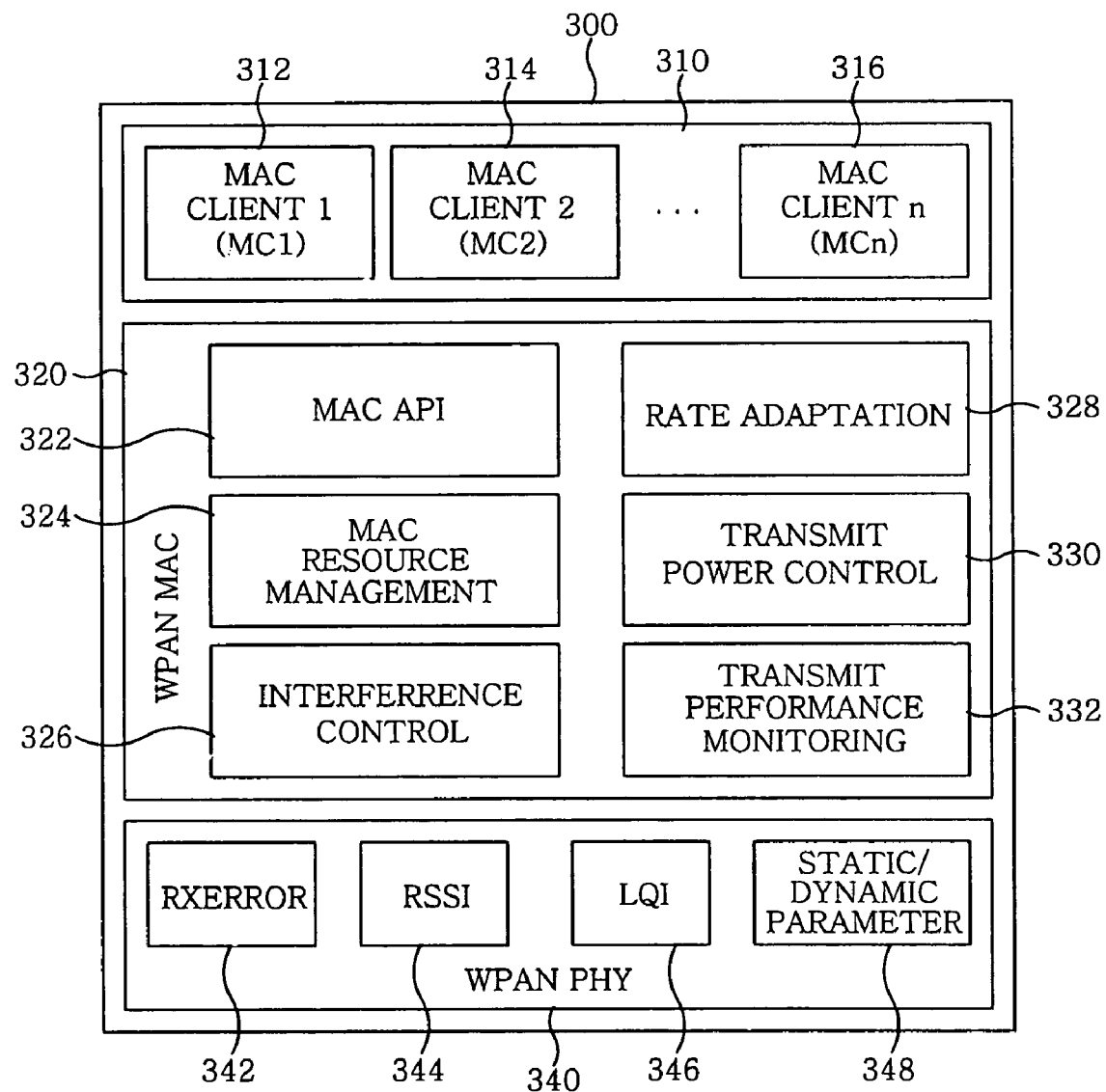
FIG. 3 is a block diagram illustrating a structure of a WPAN in accordance with an embodiment of the present invention.

FIG. 3 is a block diagram illustrating the structure of a WPAN in accordance with an embodiment of the present invention.

As shown in FIG. 3, the WPAN 300 includes a Media Access Control (MAC) layer 320, a MAC client layer 310 above the MAC layer 320, and a physical layer 340 below the MAC layer 320.

Each of MAC clients 312, 314, and 316 in the MAC client layer 310 determines a resource allocation scheme and the amount of resources suitable for supporting a specific service and sends a request to a MAC application programming interface (API) function block 322 in the MAC layer 320.

The MAC layer 320 allocates resources required by a MAC resource manager block 324 by synthetically taking into consideration functions such as a transmission performance monitoring function 332, an interference control function 326, and a transmission power control function 330, and a data rate control function 328 which use information received through the MAC API function block 322; information of the physical layer 340 such as a reception error 342, a link quality state 346, a received signal intensity 344, a static/dynamic physical layer parameter 348, a transmission power level, and a transmission speed provided by the physical layer 340; and information of variously detecting transmission states at the MAC layer 320.

Figure 4B:
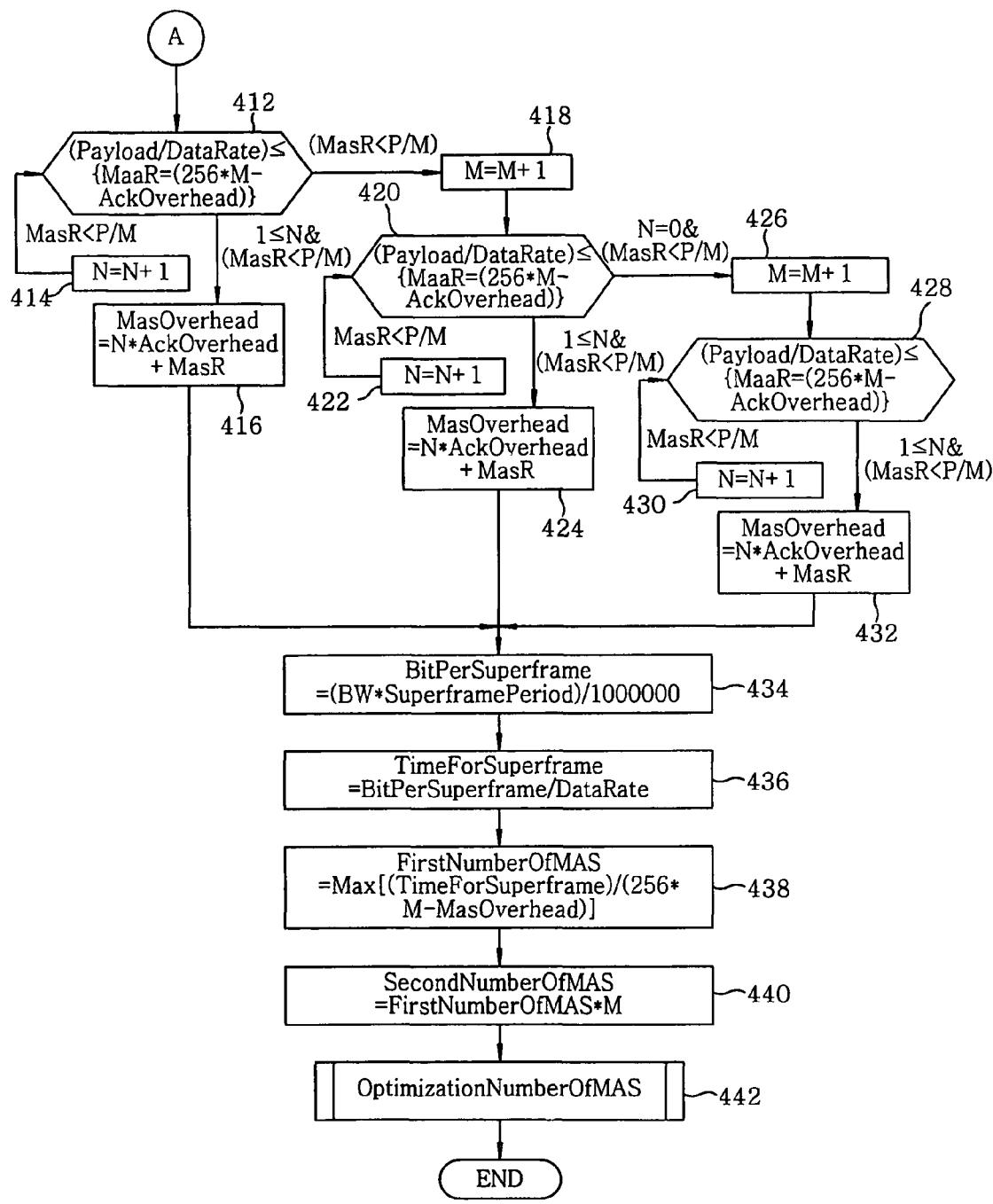

FIGS. 4A and 4B are flow charts illustrating a procedure for determining a first number of Medium Access Slots (MASs) required per superframe in accordance with an embodiment of the present invention.

As shown in FIG. 4A, at step 400, the MAC layer 320 defines and initializes required parameters such as BW (requested amount of allocated resources), N (the number of frames transmitted), M (the number of consecutive MASs), DataRate (data rate), AckPolicy (acknowledgement policy), BurstMode (interframe space), AckOverhead (overhead depending on acknowledgement policy), MasR (the amount of MAS remaining after transmitting frame), MasOverhead (overhead in single or consecutive MASs), BitPerSuperframe (the amount of data to be transmitted per superframe), TimeForSuperframe (time to be allocated per superframe), FirstNumberOfMAS (first number of MASs allocated per superframe), SecondNumberOfMAS (second number of MASs allocated per superframe), and OptimizationNumberOfMAS (optimized number of MASs per superframe).

At step 402, the MAC layer 320 branches into two different processes for calculating a required overhead in accordance with the acknowledgement policy and a burst mode which is an interframe transmission mode. Specifically, when it is determined at step 402 that the acknowledgement policy is No_ACK and the interframe transmission mode is a burst mode, the MAC layer 320 proceeds to step 404, to determine a data rate to be transmitted. When the data rate is 200 Mbps or less, the MAC layer proceeds to step 406 to apply 14□us and 2□us respectively to a burst preamble type and a burst interframe space, thereby determining that the overhead value (AckOverhead), which is determined based on the acknowledgement policy, is 16□us. Thereafter, it proceeds to step 412.

When it is determined at step 404 that the data rate is higher than 200 Mbps, the MAC layer proceeds to step 408 to apply 10□us and 2□us respectively to the burst preamble type and the burst interframe space, thereby determining that the overhead value (AckOverhead) determined based on the acknowledgement policy is 12□us. Then it proceeds to step 412.

If it is determined at step 402 that the acknowledgement policy is IMM_ACK and the interframe space corresponds to a normal burst mode, the MAC layer 320 proceeds to step 410 to determine that the overhead value (AckOverhead) is 48□s in accordance with the applied normal preamble type, and then proceeds to step 412. That is, the overhead value is the total sum of 14 us of a preamble and Packet Level Control Processor (PLCP) header transmission time; and 34□us which is the sum of 14 us required to receive an IMM_ACK frame after a Short Interframe Space (SIFS) and a time (10□us) before the next frame transmission time.

At step 412 shown in FIG. 4B, the MAC layer 320 calculates a time remaining after one payload is transmitted in one MAS. If another payload can be transmitted in the time remaining after one payload is transmitted at step 412, the MAC layer 320 proceeds to step 414 to increase the number of transmitted frames by 1. If another payload cannot be transmitted in the time remaining after one payload is transmitted at step 412, the MAC layer 320 proceeds to step 416 to calculate the sum of an overhead (AckOverhead) included in the frames and the remaining time MasR to calculate an overhead (MasOverhead) generated per MAS and then proceeds to step 434.

If it is determined at step 412 that one payload cannot be transmitted in one MAS and needs to be transmitted in two consecutive MASs, the MAC layer 320 proceeds to step 418 to increase the parameter "M" indicating the number of consecutive MASs by 1 and proceeds to step 420.

At step 420, the MAC layer 320 calculates a time remaining after one payload is transmitted in two consecutive MASs. If another payload can be transmitted in the time remaining after one payload is transmitted at step 412, the MAC layer 320 proceeds to step 422 to increase the number of transmitted frames by 1. If another payload cannot be transmitted in the time remaining after one payload is transmitted, the MAC layer 320 proceeds to step 424 to calculate the sum of an overhead (AckOverhead) included in the frames and the remaining time MasR to calculate an overhead (MasOverhead) generated per MAS and then proceeds to step 434. If it is determined at step 420 that one payload also cannot be transmitted in two MASs and needs to be transmitted in three consecutive MASs, the MAC layer 320 proceeds to step 426 to further increase the parameter "M" indicating the number of consecutive MASs by 1 and proceeds to step 428.

At step 428, the MAC layer 320 calculates a time remaining after one payload is transmitted in three consecutive MASs. If another payload can be transmitted in the time remaining after one payload is transmitted at step 412, the MAC layer 320 proceeds to step 430 to increase the number of transmitted frames by 1. If another payload cannot be transmitted in the time remaining after one payload is transmitted, the MAC layer 320 proceeds to step 432 to calculate the sum of an overhead (AckOverhead) included in the frames and the remaining time MasR to calculate an overhead (MasOverhead) generated per MAS and then proceeds to step 434.

That is, in the procedure of steps 412 to 432, the MAC layer 320 determines whether or not a frame payload can be transmitted in one MAS at a specific data rate depending on the length of the payload. The MAC layer 320 also determines whether or not a payload can be transmitted in two or three consecutive MASs, taking into consideration even the case where the maximum payload length (4095 bytes) is transmitted at a lowest data rate and determines the overhead MacOverhead by adding the overhead AckOverhead included in the frames and the last remaining MAS time.

At step 434, the MAC layer 320 calculates BitPerSuper frame of the number of frame bits to be transmitted per superframe. At step 436, the MAC layer 320 calculates the amount of resources to be allocated per superframe by dividing the number of frame bits calculated at step 434 by a selected data rate. At step 438, the MAC layer 320 primarily calculates the maximum number of MASs required to transmit only payloads using the amount of resources (TimeforSuperframe) to be allocated per superframe calculated at step 436, excluding the overhead (MacOverhead) included in each MAS calculated at steps 416, 424, and 432.

At step 440, the MAC layer 320 secondarily calculates the number of MASs required per superframe taking into consideration the minimum number of consecutive MASs required to transmit one payload. At step 442, the MAC layer 320 performs a procedure for optimizing the number of MASs required per each of superframes calculated at steps 400 to 440.

Figure 5A:
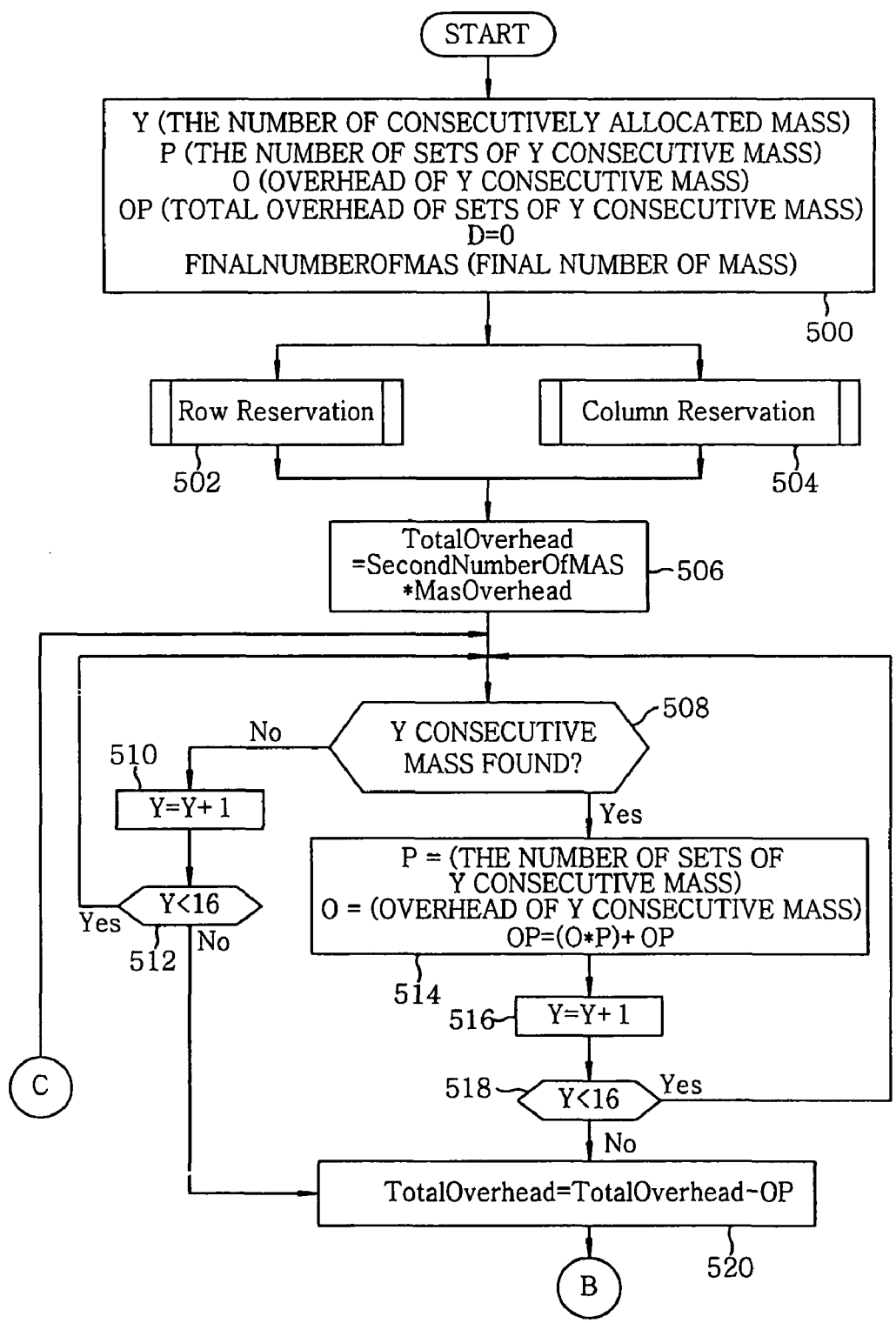
FIGS. 5A and 5B are flow charts illustrating a procedure for optimizing the number of MASs required per superframe in accordance with an embodiment of the present invention.
Figure 5B:
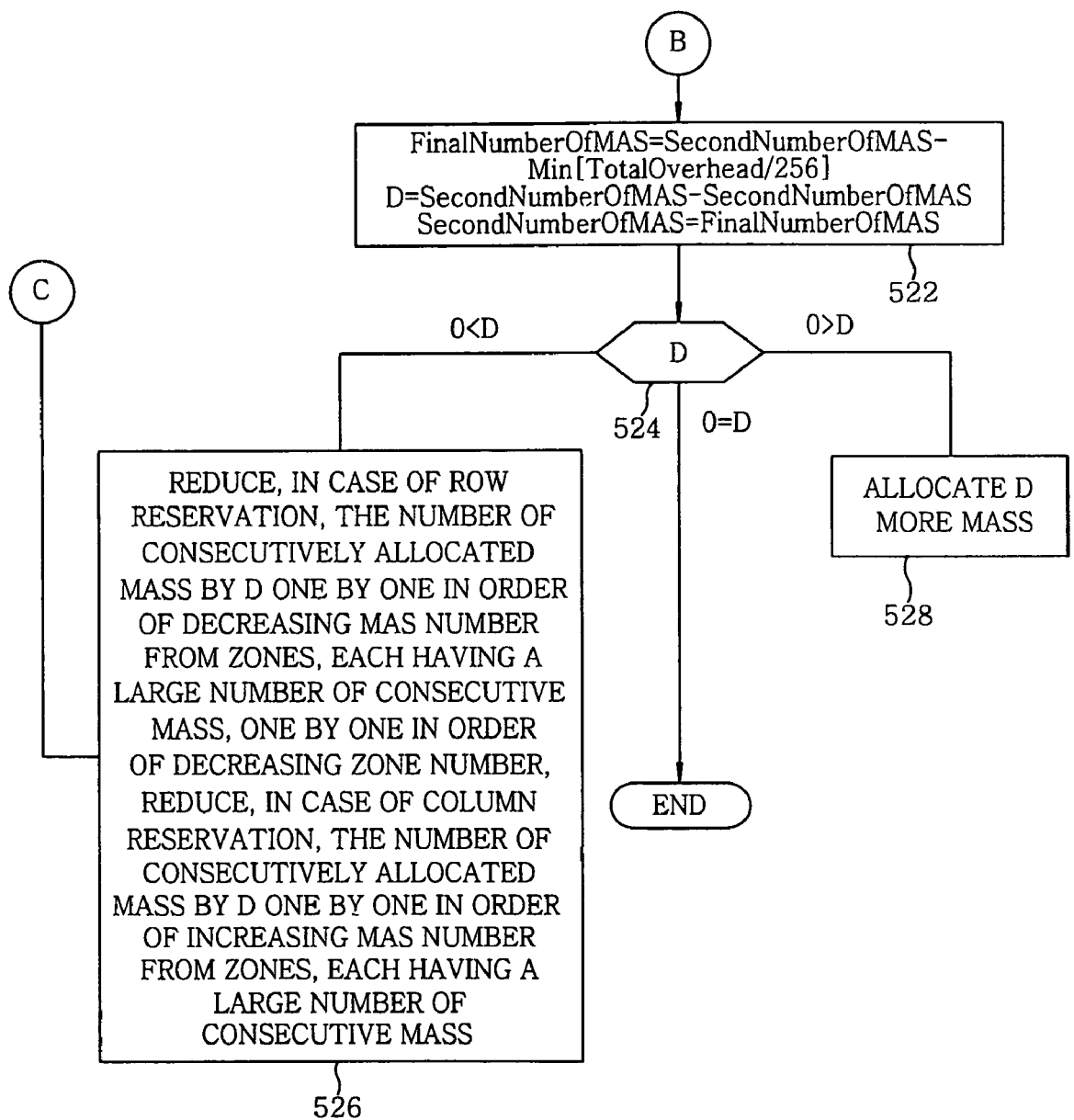

FIGS. 5A and 5B are flow charts illustrating a procedure for optimizing the number of MASs required per superframe in accordance with an embodiment of the present invention.

As shown in FIGS. 5A and 5B, at step 500, the MAC layer 320 defines and initializes required parameters such as Y (the number of consecutively allocated MASs), P (the number of sets of Y consecutive MASs), O (overhead of Y consecutive MASs), OP (total overhead of sets of Y consecutive MASs), and D (the difference between the number of allocated MASs and the number of reallocated MASs), which are for optimizing the number of MASs finally required for each superframe.

Thereafter, at step 502, using a method in which required MASs are allocated to the same positions of zones excluding beacon transmission zones of MAS numbers 0 to 15, the MAC layer 320 allocates MASs required per superframe taking into consideration the number of consecutive MASs "M" calculated in the procedure of FIGS. 4A and 4B. Here, the MAC layer 320 manages the zones by dividing them into 16 zones, each having 16 MASs. The MAC layer 320 then proceeds to step 506.

At step 504, the MAC layer 320 determines whether or not it is possible to allocate MASs to each of the zones excluding the beacon transmission zone (MAS numbers 0 to 15), starting from Zone 8, and allocates MASs required per superframe to zones in the order of {Zone 4 or Zone 12}->{Zone 2, Zone 6, Zone 10 or Zone 14}->{Zone 1, Zone 3, Zone 5, Zone 7, Zone 9, Zone 11, Zone 13 or Zone 15}, taking into consideration the number of consecutive MASs "M" calculated in FIG. 4 and then proceeds to step 506.

At step 506, the MAC layer 320 calculates a total overhead (TotalOverhead) using SecondNumberOfMas and MasOverhead calculated in the procedure of FIGS. 4A and 4B and then proceeds to step 508. At step 508, the MAC layer 320 checks allocated MASs, starting from MASs, each of which is not consecutive but consists of one MAS. Then, if there is no MASs, each of which consists of Y consecutively allocated MASs, the MAC layer 320 proceeds to step 510 to increase the number of consecutive MASs "Y" by 1. The MAC layer 320 then compares the increased number of consecutive MASs "Y" with "16" which is the maximum number of consecutive MASs that can be allocated to each zone, except the beacon zone. The MAC layer 320 returns to step 508 if "Y" is less than 16 and proceeds to step 520 if "Y" is equal to or higher than 16.

If there are Y consecutively allocated MASs, the MAC layer 320 proceeds to step 514 to calculate a total overhead included in the Y consecutive MASs. Then, at step 516, the MAC layer increases the value "Y" by 1 in order to find consecutive MASs. Then, at step 518, the MAC layer 320 compares the increased number of consecutive MASs "Y" with "16" which is the maximum number of consecutive MASs that can be allocated to each zone, except the beacon zone. The MAC layer 320 returns to step 508 if "Y" is less than 16 and proceeds to step 520 if "Y" is equal to or higher than 16.

At step 520, the MAC layer 320 calculates the difference between the overhead calculated at step 514 and the overhead calculated at step 506 and then proceeds to step 522 in FIG. 5B. At step 522, the MAC layer 320 converts the overhead value reduced at the above step 520 into a minimum number of MASs and calculates a number of unnecessary MASs "D". Then, at step 524, the MAC layer 320 determines whether the value "D" calculated at step 522 is negative, zero, or positive. If the value "D" is zero, the MAC layer 320 terminates the optimization procedure since the value "zero" indicates that the optimization per superframe has been completed.

If the value "D" is positive indicating that the number of MASs can be reduced, the MAC layer 320 proceeds to step 526. At step 526, in the case of row reservation, the MAC layer 320 reduces the number of consecutively allocated MASs by D, one by one in order of increasing MAS number from zones, each having a large number of consecutive MASs, one by one in order of decreasing zone number. In the case of column reservation, the MAC layer 320 reduces the number of consecutively allocated MASs by D, one by one starting from a MAS of a small MAS number in the order in which MASs were allocated at step 504, in each of the zones including the number of consecutively allocated MASs. The MAC layer 320 then returns to step 508 in FIG. 5A in order to check whether or not reallocation of MASs is appropriate.

If it is determined at step 524 that the value "D" is negative, the MAC layer 320 returns to step 502 or 504 to increase the number of MASs required per superframe by D to perform resource reallocation.

Figure 6:
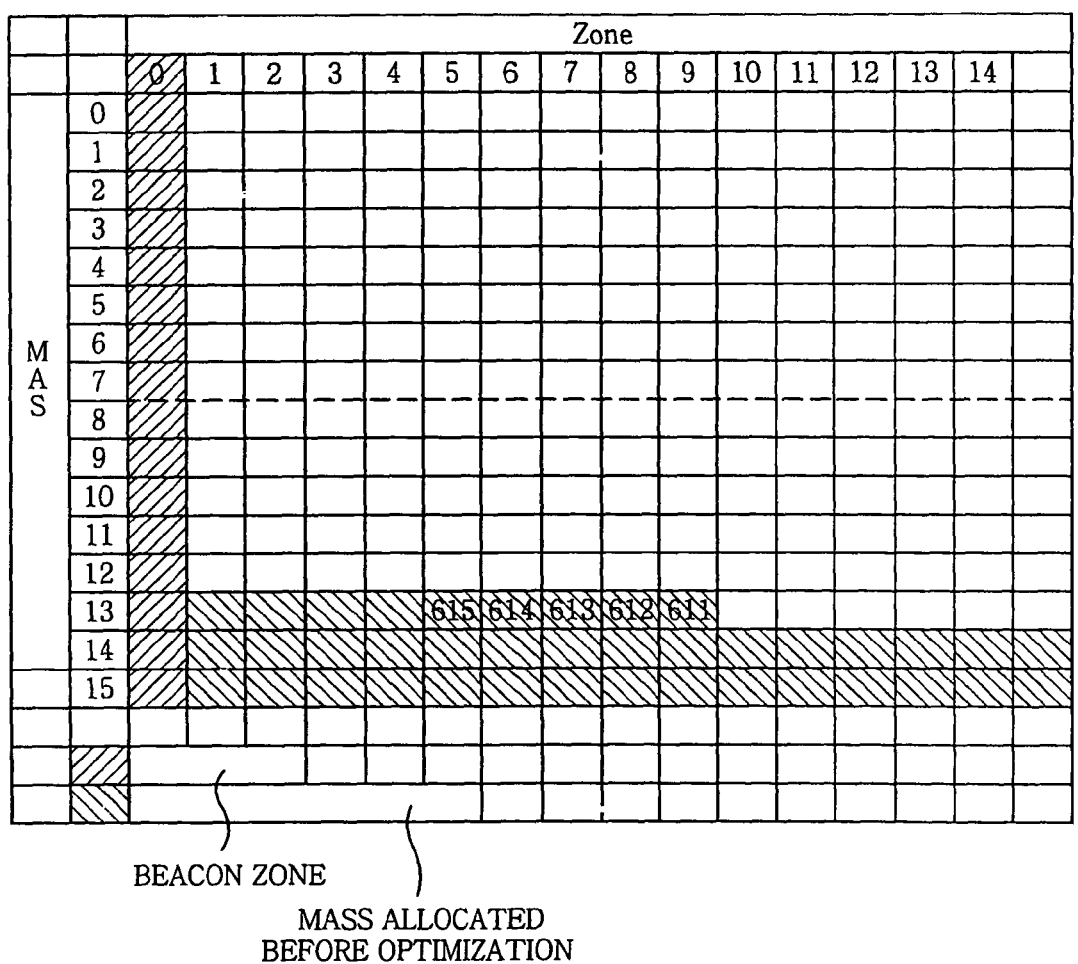
FIG. 6 illustrates an example of resources optimally allocated using a resource allocation method of a row reservation scheme in accordance with an embodiment of the present invention.

FIG. 6 illustrates an example of resources optimally allocated using a resource allocation method of a row reservation scheme in accordance with an embodiment of the present invention.

In the example of FIG. 6, MASs are optimally allocated using the row reservation scheme of FIGS. 5A and 5B. In FIG. 6, 611, 612, 613, 614, and 615 denote MASs deallocated by the optimization process of FIGS. 5A and 5B. Here, the MASs 611, 612, 613, 614, and 615 have been deallocated in that order.

Figure 7:
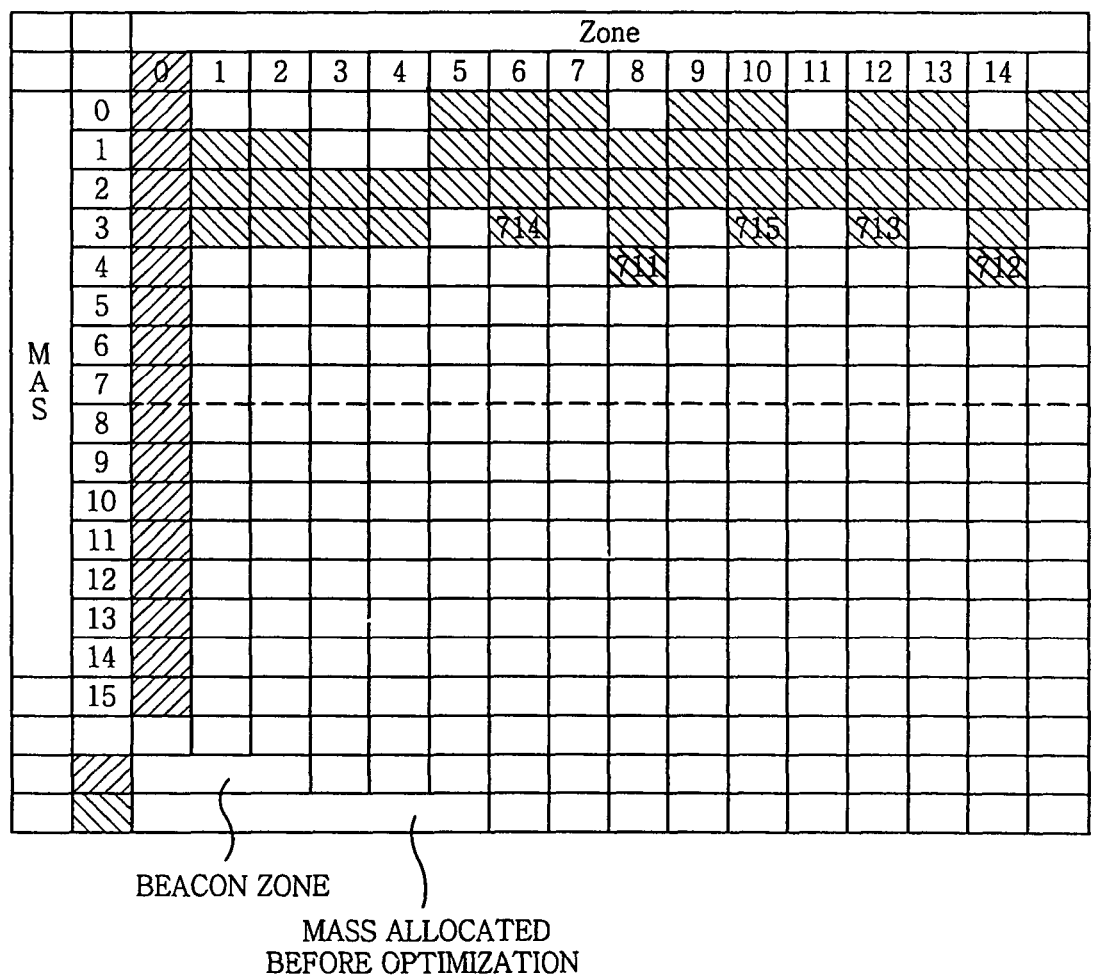
FIG. 7 illustrates an example of resources optimally allocated using a resource allocation method of a column reservation scheme in accordance with an embodiment of the present invention.

FIG. 7 illustrates an example of resources optimally allocated using a resource allocation method of a column reservation scheme in accordance with an embodiment of the present invention.

In the example of FIG. 7, MASs are optimally allocated using the column reservation scheme of FIGS. 5A and 5B. In FIG. 7, 711, 712, 713, 714, and 715 denote MASs deallocated by the optimization process of FIGS. 5A and 5B. Here, the MASs 711, 712, 713, 714, and 715 have been deallocated in that order.

As is apparent from the above description, the present invention provides a distributed MAC resource allocation method and apparatus in a WPAN which can optimize distributed allocation of MAC resources in the WPAN to prevent waste of wireless resources. Specifically, the method and apparatus can determine the number of Medium Access Slots (MASs) required per superframe and optimize a final number of MASs required per superframe for optimizing distributed allocation of MAC resources in the WPAN.

While the invention has been shown and described with respect to the embodiments, it will be understood by those skilled in the art that various changes and modifications may be made without departing from the scope of the invention as defined in the following claims.

What is claimed is:

1. A method for allocating distributed Medium Access Control (MAC) resources in a wireless personal area network, the method comprising:
    calculating an acknowledgement overhead determined based on an acknowledgement policy when wireless resources are allocated through networking with other distributed devices;
    calculating a Medium Access Slot (MAS) overhead determined based on a payload length of a frame;
    calculating a transfer rate required per superframe based on the calculating MAS;
    calculating a number of frame bits to be transmitted per superframe;
    calculating a first number of MASs required per superframe; and
    optimizing a final number of MASs required per superframe,
    wherein the calculating the first number of MASs required per superframe calculates the number of the frame bits and the transfer rate required per superframe and determines the first number of MASs required per superframe in order to satisfy service requirements requested by a MAC client, and
    wherein the optimizing the final number of MASs required per superframe includes:
    allocating MASs in a manner of a row reservation scheme or a column reservation sheme taking into consideration the first number of MASs;
    calculating an overhead required per superframe and calculating an overhead in accordance with a number of consecutively allocated MASs;
    converting into MASs as much as a reduced overhead;
    reducing, when MASs have been allocated by the row reservation scheme, the number of allocated MASs by the unnecessary number of MASs one by one in order of increasing MAS number from zones, each having large number of consecutive MASs, one by one in order of decreasing zone number; and
    reducing, when MASs have been allocated by the column reservation scheme, the number of allocated MASs by the unnecessary number of MASs one by one in order of increasing MAS number from zones, each having a large number of consecutive MASs.

2. The method of claim 1, wherein the calculating the acknowledgement overhead calculates, the acknowledgement overhead based on the acknowledgement policy, an interframe space, and a preamble type.

3. The method of claim 1, further comprising:
    determining whether or not a payload can be transmitted in one MAS at a specific transfer rate in accordance with the payload length of the frame;
    determining whether or not the payload can be transmitted in two or three consecutive MASs, taking into consideration even a case where a maximum payload length is transmitted at a lowest transfer rate; and
    determining the MAS overhead by adding the acknowledgement overhead included in the frame and a last remaining MAS time.

4. A distributed Medium Access Control (MAC) resource allocation apparatus in a Wireless Personal Area Network (WPAN), the apparatus comprising:
    a MAC client for determining a resource allocation scheme and an amount of resources for supporting a specific service and sending a request to a MAC resource management unit;
    a MAC physical layer for providing a received power level, a link quality state, a receiving state, and a static or dynamic physical layer parameter to the MAC resource management unit; and
    the MAC resource management unit for determining a payload length of a transfer frame, a transfer rate, an acknowledgement policy, an interframe space, and a preamble type in accordance with requirements requested by the MAC client, taking into consideration at least one of transfer rate control information, transmission power control information, interference control information, and transmission performance monitoring information, and for allocating wireless resources to devices connected to the WPAN,
    wherein the MAC resource management unit calculates the acknowledgment overhead based on the acknowledgement policy, the interframe space, and the preamble type, and
    wherein the MAC resource management unit determines whether or not a payload can be transmitted in one MAS at a specific transfer rate in accordance with the payload length of the frame; determines whether or not the payload can be transmitted in two or more consecutive MASs, taking in consideration even a case where a maximum payload length is transmitted at a lowest transfer rate; and determines the MAS overhead by adding the acknowledgment overhead included in the frame and a last remaining MAS time.

5. The apparatus of claim 4, wherein the MAC resource management unit calculates an acknowledgement overhead determined based on an acknowledgement policy; calculates a Medium Access Slot (MAS) overhead determined in accordance with a payload length of a frame to calculate a transfer rate required per superframe; calculates a number of frame bits to be transmitted per superframe; calculates a first number of MASs required per superframe; and optimizes a final number of MASs required per superframe.

6. The apparatus of claim 5, wherein the MAC resource management unit calculates the number of frame bits and the transfer rate required per superframe and determines the first number of MASs required per superframe in order to satisfy service requirements requested by a MAC client.

7. The apparatus of claim 5, wherein the MAC resource management unit optimizes the final number of MASs required per superframe by allocating MASs in a manner of a row reservation scheme or a column reservation scheme taking into consideration the first number of MASs; calculating an overhead required per superframe and calculating an overhead in accordance with a number of consecutively allocated MASs; converting into MASs as much as a reduced overhead; reducing, when MASs have been allocated by the row reservation scheme, the number of allocated MASs by the unnecessary number of MASs one by one in order of increasing MAS number from zones, each having a large number of consecutive MASs, one by one in order of decreasing zone number; and reducing, when MASs have been allocated by the column reservation scheme, the number of allocated MASs by the unnecessary number of MASs one by one in order of increasing MAS number from zones, each having a large number of consecutive MASs.

* * * * *